US010632386B1

(12) United States Patent
Curtis et al.

(10) Patent No.: US 10,632,386 B1
(45) Date of Patent: *Apr. 28, 2020

(54) SYSTEM AND METHOD FOR IMPLEMENTING DYNAMIC CONTENT AVAILABILITY FOR INDIVIDUAL PLAYERS

(71) Applicant: Electronic Arts Inc., Redwood City, CA (US)

(72) Inventors: Matthew Curtis, Novato, CA (US); James Koh, Mountain View, CA (US); Kellen Christopher Smalley, Pleasanton, CA (US); Michael C. Caldarone, Palo Alto, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/722,951

(22) Filed: Oct. 2, 2017

Related U.S. Application Data

(63) Continuation of application No. 15/166,253, filed on May 26, 2016, now Pat. No. 9,776,089, which is a continuation of application No. 14/023,279, filed on Sep. 10, 2013, now Pat. No. 9,352,217.

(51) Int. Cl.
*A63F 9/24* (2006.01)
*A63F 13/67* (2014.01)
*A63F 13/537* (2014.01)

(52) U.S. Cl.
CPC ............ *A63F 13/67* (2014.09); *A63F 13/537* (2014.09)

(58) Field of Classification Search
CPC ............ A63F 13/00; A63F 13/12; A63F 13/67
See application file for complete search history.

(56) References Cited

U.S. PATENT DOCUMENTS

| | | | |
|---|---|---|---|
| 6,878,063 B2 | 4/2005 | Manfredi | |
| 7,976,390 B2 | 7/2011 | Schneider | |
| 8,425,311 B2 | 4/2013 | Schneider | |
| 8,449,384 B2 | 5/2013 | Baerlocher | |
| 2005/0282638 A1 | 12/2005 | Rowe | |
| 2007/0129148 A1* | 6/2007 | Van Luchene | G06Q 30/04 463/42 |
| 2008/0076527 A1* | 3/2008 | Low | G07F 17/32 463/25 |
| 2008/0207327 A1* | 8/2008 | Van Luchene | A63F 13/12 463/42 |
| 2010/0029363 A1* | 2/2010 | Hoffman | G07F 17/32 463/20 |
| 2011/0230267 A1* | 9/2011 | Van Luchene | A63F 13/77 463/42 |

(Continued)

*Primary Examiner* — Steve Rowland
(74) *Attorney, Agent, or Firm* — Knobbe, Martens, Olson & Bear, LLP

(57) ABSTRACT

One aspect of the disclosure relates to automatically triggering events (e.g., sales, promotions, gameplay-based events, and/or other events) in an online game based on varying levels of spend by users in the game. This automation of live operations in the online game may provide for management of revenue generation in the online game. The events may serve to draw users into the online game during traditional off-peak hours, may serve to entice user spending in the online game during times when spending would be low without an event, and/or provides for other enhancements.

22 Claims, 9 Drawing Sheets

(56) References Cited

U.S. PATENT DOCUMENTS

| | | |
|---|---|---|
| 2012/0238341 A1 | 9/2012 | Tarantino |
| 2012/0270639 A1 | 10/2012 | Walker |
| 2012/0329551 A1 | 12/2012 | Arezina |

* cited by examiner

Specific Group of Players, Revenue Per Unit Time

| Unit Time | Revenue Parameter | DESCRIPTION |
|---|---|---|
| 0 | 100 | Trigger 1 to 3 hour engagement event (perform action X) and special item Y is available for purchase |
| 1 | 200 | |
| 2 | 300 | |
| 3 | 400 | |
| 4 | 500 | |
| 5 | 600 | |
| 6 | 700 | |
| 7 | 800 | |
| 8 | 900 | |
| 9 | 1000 | |
| 10 | 1100 | Trigger widespread engagement event + high-impact but item purchase event |
| 11 | 1200 | |
| 12 | 1300 | |
| 13 | 1200 | |
| 14 | 1100 | |
| 15 | 1000 | |
| 16 | 900 | |
| 17 | 800 | |
| 18 | 700 | |
| 19 | 600 | |
| 20 | 500 | Trigger 1 to 3 hour engagement event (perform action X) and special item Y is available for purchase |
| 21 | 400 | |
| 22 | 300 | |
| 23 | 200 | |

FIG. 3

SYSTEM AND METHOD FOR IMPLEMENTING DYNAMIC CONTENT AVAILABILITY FOR INDIVIDUAL PLAYERS

FIELD

The disclosure relates to implementing dynamic content availability for individual players.

BACKGROUND

In various online games, during different times of the day, players become idle and do not participate in the game. In some implementations, players are idle when they are not playing the game. In some implementations, players are idle when they do not purchase virtual currency.

SUMMARY

One aspect of the disclosure relates to automatically triggering events (e.g., sales, promotions, gameplay-based events, and/or other events) in an online game based on varying levels of spend by users in the game. This automation of live operations in the online game may provide for management of revenue generation in the online game. The events may serve to draw users into the online game during traditional off-peak hours, may serve to entice user spending in the online game during times when spending would be low without an event, and/or provides for other enhancements.

A system configured to automatically trigger and/or run events in an online game may include one or more processors configured to execute compute program modules. The program modules may comprise a game module, a user module, a spend module, and event trigger module, an event module, a notification module, a game space parameter module, a user grouping module and/or any other modules.

A game module may be configured to execute a game instance of a game space. The game instance may be used to facilitate presentation of views of the game space to users. The game instance may be configured to facilitate interaction of the users with the game space and/or each other by performing operations in the game instance in response to commands and/or any other input received from the users.

A user module may be configured to store inventories of items that are available to the users in the game space. The inventories may include a first inventory of items available to a first user in the game space. The items may include a first virtual item and/or any other item. A virtual item may be an item that can be used in the game instance by the user. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items.

A game module may be configured to execute a game instance of a game space, and to facilitate presentation of views of the game space to users. The game space may be configured to facilitate interaction of the users with the game space and/or each other by performing operations in the game space in response to commands received from the users.

A spend module may be configured to determine a revenue parameter that characterizes a spend rate at which users in the game are currently spending consideration in the game.

An event trigger module may be configured to automatically trigger an event based on the revenue parameter in order to regulate the spend rate in the game. The event trigger module may be configured to select the event from multiple possible events based on the revenue parameter module, previously triggered events, and/or one or more game parameters and/or any other parameters. The event trigger module may be configured to determine an event type and/or one or more event parameters based on the revenue parameter module, previously triggered events, and/or one or more game parameters and/or any other parameters. The event trigger module may be configured to provide a user interface to an operator of the game to receive entry and/or selection of rules for triggering events. The event trigger module may trigger the event based on the received rules and/or any other rules. The event trigger module may be configured to provide a user interface to an operator of the game to receive entry and/or selection of event parameters for events to be run in the game. The event trigger module may be configured to determine an event parameter of the triggered event based on the revenue parameter and/or any other parameter. The event trigger module may be configured to determine an event parameter of the triggered event based on a game parameter and/or any other parameter.

An event module may be configured to run the triggered event and/or any other events. The event module may be configured such that the triggered event comprises one or more of a: promotion, off-peak hour game play, or tournament and/or any other event.

A notification module may be configured to provide notification of the triggered event to users that are not in the game at the time the event is initiated and/or at any other time.

A game space parameter module may be configured to determine game space parameters, wherein the event trigger module may be configured to trigger the event based on one or more game space parameters and/or any other parameters.

A user grouping module may be configured to group users into classifications based on one or more user parameters and/or any other parameters.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3 illustrates an exemplary diagram of an operator interface which implements dynamic content availability for individual players, according to an aspect of the invention.

DETAILED DESCRIPTION

Figure 1:
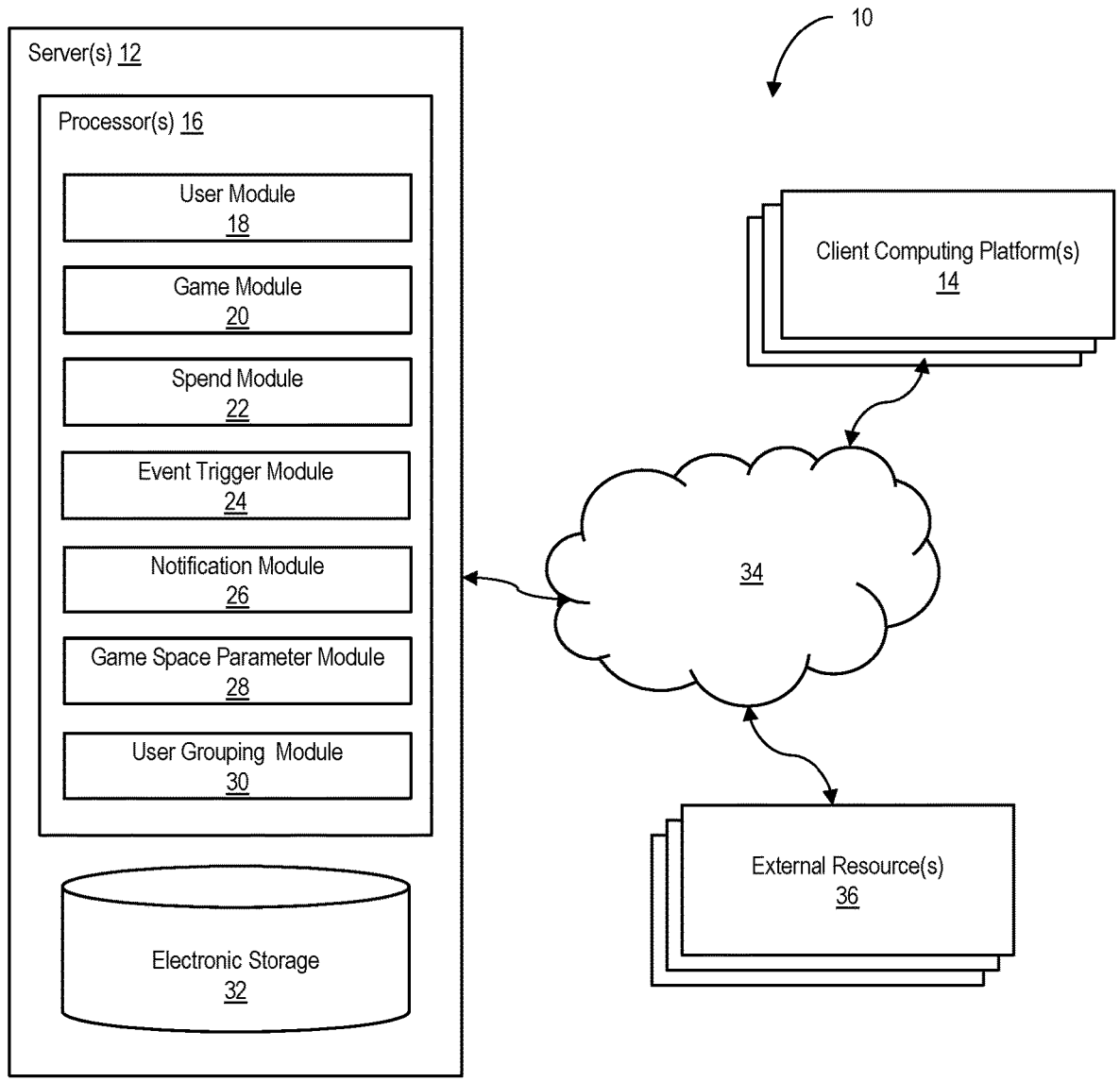
FIG. 1 illustrates an exemplary system configured to implement dynamic content availability for individual players, according to an aspect of the invention.

FIG. 1 illustrates a system 10 configured facilitate providing a tiered rebate system to a user of an online game, according to an aspect of the invention. The program modules may comprise a user module 18, a game module 20, an interaction module, a network module, a store module, a spend module 22, an event trigger module 24, a notification module 26, a game space parameter module 28, a user grouping module 30 and/or any other modules. In some implementations, system 10 may include a game server(s) 12. The game server(s) 12 may host a game space in which an online game takes place. The game server(s) 12 may be configured to communicate with one or more client computing platform(s) 14 according to a client/server architecture. The users may access system 10 and/or the virtual space via client computing platform(s) 14.

The game server(s) 12 may be configured to execute one or more computer program modules. The computer program modules may include one or more of a user module 18, a game module 20, an interaction module, a network module, a store module, a spend module 22, an event trigger module 24, a notification module 26, a game space parameter module 28, a user grouping module 30 and/or any other modules.

The system may comprise a user module 18 configured to store inventories of virtual items that are available to users in the game space. The inventories may include a first inventory and/or any other inventory of virtual items available to a first user in the game space.

The user module 18 may be configured to access and/or manage one or more user profiles and/or user information associated with users of the system 10. The one or more user profiles and/or user information may include information stored by game server(s) 12, one or more of the client computing platform(s) 14, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The user module 18 may be configured to store inventories of virtual items including resources that are available to users in the virtual space. Various matters may be collected in an inventory. These matters may include, but are not limited to, virtual items, virtual resources, character attributes, character skills, and/or virtual currency. A virtual item may be an item that can be used in a virtual world to assist a player's character. Examples of virtual items include, but are not limited to, valuables (money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, non-player characters (NPCs), building materials, potions, etc. A character attribute may be any quality, trait, feature and/or characteristic a particular character can have. Character attributes may include, but are not limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

The user maintains an inventory for the user's character in which virtual awards may be collected. The inventory may be accessed through an interface. As the character or other entity progresses through the game it may receive access to higher-level items. Higher-level items may be more powerful and/or effective within the game. This may include having parameters (e.g., hit points, attack strength, defense points, speed, etc.) that enhance the functionality of the items in the game. The player may be able to review items within the player's inventory and equip the character and/or other entity with an item appropriate to the current game situation. Items may be dragged from the inventory to a preview window. As items are selected, they may appear either on or next to the character or entity. For example, if the character entity is currently not building and/or researching anything, a building may be built and/or research may be started by—accessing the character's inventory and utilizing virtual items. Management of a character's inventory is a common game mechanic, and may lead to many hours of game play. Players may collect, trade, buy, fight over items, and/or perform other actions to add to their inventory. Games in different genres, such as science fiction, may incorporate items specific to that genre. For example, laser guns may be substituted in place of swords as the standard weapon used by characters within a science fiction-type game. The data describing clothing and other equipment or gear may be stored in the character record.

Players within the game may acquire virtual currency. In such games, the virtual currency might be represented by virtual coins, virtual cash, or by a number or value stored by the server for that player's benefit. Such virtual currency may represent units of value for use as consideration in transactions in the online game system, and/or may be analogous to legal currency. Virtual currency can be purchased for real money consideration. Such purchases may be made for cash or credit denominated in real money, made be made for another virtual currency previously purchased by a player for real money (e.g., Facebook credits, Bitcoins, and/or other virtual currency). A player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

Virtual currency may be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit. Once the necessary selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset or other benefit.

Multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. Virtual cash may also be awarded for leveling up in the game.

The game module 20 may be configured to execute a game instance of a game space. The game instance may be used to facilitate presentation of views of the game space to users. The game instance may be configured to facilitate interaction of the users with the game space and/or each other by performing operations in the game instance in response to commands and/or any other input received from the users.

The game module 20 may be configured to implement the instance of the virtual space executed by the computer modules to determine state of the virtual space. The state may then be communicated (e.g., via streaming visual data, via object/position data, and/or other state information) from server(s) 12 to client computing platform(s) 14 for presentation to users. The state determined and transmitted to a given client computing platform(s) 14 may correspond to a view for a user character being controlled by a user via the given client computing platform(s) 14. The state determined and transmitted to a given client computing platform(s) 14 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platform(s) 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by game module 20 is not intended to be limiting. The game module 20 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game module 20, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platform(s) 14. The users may interact with each other through communications exchanged within the virtual space. Such communications may include one or more of textual chat, instant messages, private messages, voice communications, and/or other communications. Communications may be received and entered by the users via their respective client computing platform(s) 14. Communications may be routed to and from the appropriate users through server(s) 12 (e.g., through game module 20).

The interaction module may be configured to monitor interactions of the users with the virtual space and/or each other within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction module in monitoring the interactions of the users may be stored to the user profiles managed by user module 18.

At a given time, interaction module may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes), and/or other taking some other action indicating ongoing and contemporaneous engagement with the virtual space.

The interaction module may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, and/or other activity parameters.

Network module of the game server(s) 12 may be configured to maintain a connection to the one or more client computing platform(s) 14. For example, the network module 26 may maintain one or more communication lines or ports to enable connection and/or exchange of information with a network 34 and/or other computing platform(s) 14. Information such as state information, game state and game logic may be communicated via network module. The network module may be configured to receive information from the client computing platform(s) 14 as well.

A store module may be configured to present a store interface to the users. The store interface may present offers to users to buy item instances of virtual items. The virtual items may include a first virtual item and/or any other item. A virtual item may be an item that can be used in the game instance by the user. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items.

A store module may be configured to effectuate presentation to the users of offers to purchase resources. The offers may include a first offer for the first user to purchase a first set of one or more virtual items. The virtual items may include a virtual good, a virtual currency, and/or other virtual items as described above. For example, the store module may be configured such that the offers presented to the first user may be restricted to offers having prices in a first price range. The first price range may be determined based on the user metric for the first user, and/or the user metric for other users. The store module may be configured such that the first price range may change as participation by the first user in the game causes the user metric for the first user to change. The store module may be configured such that the first price range may be bounded by one or more both of a minimum value and/or a maximum value. The store module may be configured such that the offers having prices below the minimum value may not be available for purchase by the first user. The store module may be configured such that offers having prices above the maximum value may be locked. This may mean the offers having prices above the maximum value may be unavailable for purchase by the first user independent from whether the first user has consideration sufficient to purchase such offers. Such offers may become unlocked as the maximum value of the price range is adjusted above the prices of such offers.

For example, players' experience with pricing of in-game goods may be associated with their progress in the game. In some implementations, the higher the level of the player, the lower the in-game goods may cost. Depending on the level of the player, the goods available to the player may change. Overall, the more the player advances in the game, new items may be unlocked to the player for purchase. Goods previously provided to the player for purchase may or may not be accessible to the player depending on the player's level.

A spend module may be configured to determine a revenue parameter that characterizes spending by users in the game. The spend module may monitor user in-game spending of one or both virtual and/or real currency. In various embodiments, players within the game can acquire virtual currency. The spend parameter may characterize, for example, a rate at which consideration is currently being spent, an amount of consideration spent during a sliding window of time, an amount of consideration spent during a present time period having a fixed beginning and end (e.g., today, this hour, and/or other time periods), and/or other aspects of spending by users in the game. The spend parameter may characterize spending in terms of in-game virtual currency spent, real money consideration spent in exchange for in-game virtual currency, and/or in other terms.

An event trigger module may be configured to automatically trigger an event based on the revenue parameter and/or any other in-game parameter in order to regulate the spend rate in the game. The event trigger module may be configured to select the event from multiple possible events based on the revenue parameter module, previously triggered events, and/or one or more game parameters and/or any other parameters. The event trigger module may configured to determine an event type and/or one or more event parameters based on the revenue parameter module, previously triggered events, and/or one or more game parameters and/or any other parameters.

The event trigger module may be configured to provide a user interface to an operator of the game to receive entry and/or selection of rules for triggering events. The event trigger module may trigger the event based on the received rules and/or any other rules. The event trigger module may be configured to provide a user interface to an operator of the game to receive entry and/or selection of event parameters for events to be run in the game. The event trigger module may be configured to determine an event parameter of the triggered event based on the revenue parameter and/or any other parameter. The event trigger module may be configured to determine an event parameter of the triggered event based on a game parameter and/or any other parameter.

The event trigger module may determine events based on an operator monitoring in-game parameters and/or a software automatically monitoring in-game parameters. The events may be triggered during one or more of revenue or other specified data patterns approaching the peak or trough of a particular group of users, who can be segmented by factors such as lifetime spend, content adoption, login time, region, language preference, server, platform, and/or any other user metric. This may enhance consistency of revenue/gameplay flow and content availability for specified player segments throughout the day. In some implementations, for a 24 hour per day revenue stream, this may enhance the revenue generated by the game, enhance user engagement over the course of the day, and/or provide other enhancements. The game database may stores relevant in-game actions (logins, other game activity), transactions (currency purchasing and spending) and segmentation information (world, locale, language, spend profile). In some implementations, a backend tool may enable an administrator to select the targeted parameters (x % less than peak [revenue, other metric] for segmentation category Y). These parameters may be used to trigger events (tournament of xyz), promotions (buy x and get y) and content availability (you can now obtain the super item X!).

A schedule may be established for events which may include, the date and time for the event, the duration of the event, and/or the display content to promote the event. In some implementations, a server may be used to configure trigger events in an online game. In some implementations, an operator may manually monitor the in-game parameters and determine which events to trigger. In-game parameters may be based on any game performance parameter, user metric, any event spend parameter and/or any other parameters.

A game performance parameter may include any aspect of a Video Game by which a player character's performance can be measured. Game Parameters shall include, but not be limited to: completing all or part of a mission; playing for a certain period of time; winning a match against another player character or computer generated character; reaching a certain level or score; using or obtaining an ability or technology; kill/death ratios; obtaining, creating or modifying an object; solving a puzzle; accuracy with weapons; effective use of the proper weapon; killing a certain character/creature; getting through or to a certain geographic area; decreasing or increasing Karma Points; getting, buying, exchanging or learning a new skill or player attribute; having a child; getting married; obtaining, buying, trading, producing or developing raw materials; producing goods or services; earning income; earning a higher rank in an army; winning an election among two or more player characters; achieving deity or other status; improving player character status or caste; assisting other player characters with any of the above; speed of accomplishing or changing the rate or trends of any or all of the above.

An event spend parameter may determine spend parameter values of a spend parameter for the users during an event time period. A spend parameter value may be determined for the first user during the event time period and/or during any other time.

The event spend parameter may be configured to obtain a start time and an end time for the event time period and/or for any other period. The start time and end time may be displayed to the player, and/or the player may be unaware of the start and end time.

The event spend parameter may be configured such that the spend parameter includes one or more of: a spend velocity, a spend frequency, a total amount spent and/or other parameters. The spend velocity may be related to how quickly a user acquires virtual in-game items. The spend frequency may be related to the number of times a user purchases virtual in-game items. The total amount spent may determine the total amount the user has spent on obtaining virtual in-game items. The event spend parameter may be configured to determine the spend parameter value for the first user during the event time period. The spend parameter value for the first user may characterize one or more aspects of spending by the first user on virtual items through the store interface during the event time period.

An event module may be configured to run the triggered event and/or any other events. The event module may be configured such that the triggered event comprises one or more of a: promotion, off-peak hour game play, or tournament, bonus game, and/or any other event. In some implementations, events may include many types of games and options for games. For example, an option can be provided to the player for playing a tournament game for a tournament prize contributed to by multiple players of the game apparatus and other linked game apparatuses. Examples of games offered by the game apparatus include action video games which provide a player with opportunities to utilize dexterity and play duration in increasing game score, chance games in which the outcome of the game is, in part, randomly influenced, quiz games providing questions to which said player responds, wagering games, electromechanical redemption games, and/or any other type of game. Certain parameters of the promotional events can be selected and/or defined by the operator and/or software, such as the triggering events, type of event, type of award, type of award progression and other parameters. Events may include, but not be limited to: completing all or part of a mission; playing for a certain period of time; winning a match against another player character or computer generated character; reaching a certain level or score; using or obtaining an ability or technology; kill/death ratios; obtaining, creating or modifying an object; solving a puzzle; accuracy with weapons; effective use of the proper weapon; killing a certain character/creature; getting through or to a certain geographic area; decreasing or increasing Karma Points; getting, buying, exchanging or learning a new skill or player attribute; having a child; getting married; obtaining, buying, trading, producing or developing raw materials; producing goods or services; earning income; earning a higher rank in an army; winning an election among two or more player characters; achieving deity or other status; improving player character status or caste; assisting other player characters with any of the above; speed of accomplishing or changing the rate or trends of any or all of the above.

A notification module may be configured to provide notification of the triggered event to users that are not in the game at the time the event is initiated and/or at any other time. Notifications of events may be in various forms including taking the form of banners, scrolling text or tickers, flashing objects, pop-up windows, frames or borders, mobile application notifications, email, text, and/or any other type of notification during and/or after the execution of the game. A user may receive a notification if they are not currently participating in the game.

A game space parameter module may be configured to determine game space parameters, wherein the event trigger module is configured to trigger the event based on one or more game space parameters and/or any other parameters.

A user grouping module may be configured to group users into classifications based on one or more game performance parameter, user metric, any event spend parameter and/or any other parameters.

The game server(s) 12, client computing platform(s) 14, and/or external resource(s) 36 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game server(s) 12, client computing platform(s) 14, and/or external resource(s) 36 may be operatively linked via some other communication media.

Game server(s) 12 may include electronic storage 32, one or more processors 16, and/or other components. Game server(s) 12 may include communication lines, or ports to enable the exchange of information with a network 34 and/or other computing platforms 14. Illustration of game server(s) 12 in FIG. 1 is not intended to be limiting. Game server(s) 12 may include a plurality of hardware, software, and/or firmware components operating together to provide the functionality attributed herein to game server(s) 12. For example, game server(s) 12 may be implemented by a cloud of computing platforms operating together as game server(s) 12.

Electronic storage 32 may comprise non-transitory storage media that electronically stores information. The electronic storage media of electronic storage 32 may include one or both of system storage that is provided integrally (i.e., substantially non-removable) with game server(s) 12 and/or removable storage that is removably connectable to game server(s) 12 via, for example, a port (e.g., a USB port, a firewire port, etc.) or a drive (e.g., a disk drive, etc.). Electronic storage 32 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 32 may include one or more virtual storage resources (e.g., cloud storage, a virtual private network, and/or other virtual storage resources). Electronic storage 32 may store software algorithms, information determined by processor(s) 16, information received from game server(s) 12, information received from client computing platform(s) 14, and/or other information that enables game server(s) 12 to function as described herein.

Processor(s) 16 is configured to provide information processing capabilities in game server(s) 12. As such, processor(s) 16 may include one or more of a digital processor, an analog processor, a digital circuit designed to process information, an analog circuit designed to process information, a state machine, and/or other mechanisms for electronically processing information. Although processor(s) 16 is shown in FIG. 1 as a single entity, this is for illustrative purposes only. In some implementations, processor(s) 16 may include a plurality of processing units. These processing units may be physically located within the same device, or processor(s) 16 may represent processing functionality of a plurality of devices operating in coordination. The processor(s) 16 may be configured to execute modules 18, 20, 22, 24, 26, 28, 30, and/or 32. Processor(s) 16 may be configured to execute modules 18, 20, 22, 24, 26, 28, 30, and/or 32 by software; hardware; firmware; some combination of software, hardware, and/or firmware; and/or other mechanisms for configuring processing capabilities on processor(s) 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 22, 24, 26, 28, 30, and/or 32 are illustrated in FIG. 1 as being implemented within a single processing unit, in implementations in which processor includes multiple processing units, one or more of modules 18, 20, 22, 24, 26, 28, 30, and/or 32 may be implemented remotely from the other modules. The description of the functionality provided by the different modules 18, 20, 22, 24, 26, 28, 30, and/or 32 described below is for illustrative purposes, and is not intended to be limiting, as any of modules 18, 20, 22, 24, 26, 28, 30, and/or 32 may provide more or less functionality than is described. For example, one or more of modules 18, 20, 22, 24, 26, 28, 30, and/or 32 may be eliminated, and some or all of its functionality may be provided by other ones of modules 18, 20, 22, 24, 26, 28, 30, and/or 32. As another example, processor(s) 16 may be configured to execute one or more additional modules that may perform some or all of the functionality attributed below to one of modules 18, 20, 22, 24, 26, 28, 30, and/or 32.

A given client computing platform(s) 14 may include one or more processors configured to execute computer program modules. The computer program modules may be configured to enable an expert or user associated with the given client computing platform(s) 14 to interface with system 10, game server(s) 12, and/or external resource(s) 36, and/or provide other functionality attributed herein to client computing platform(s) 14. By way of non-limiting example, the given client computing platform(s) 14 may include one or more of a desktop computer, a laptop computer, a handheld computer, a tablet computing platform, a NetBook, a Smartphone, a gaming console, and/or other computing platforms.

External resource(s) 36 may include sources of information, hosts and/or providers of virtual spaces outside of system 10, external entities participating with system 10, and/or other resources. In some implementations, some or all of the functionality attributed herein to external resource(s) 36 may be provided by resources included in system 10.

Figure 2:
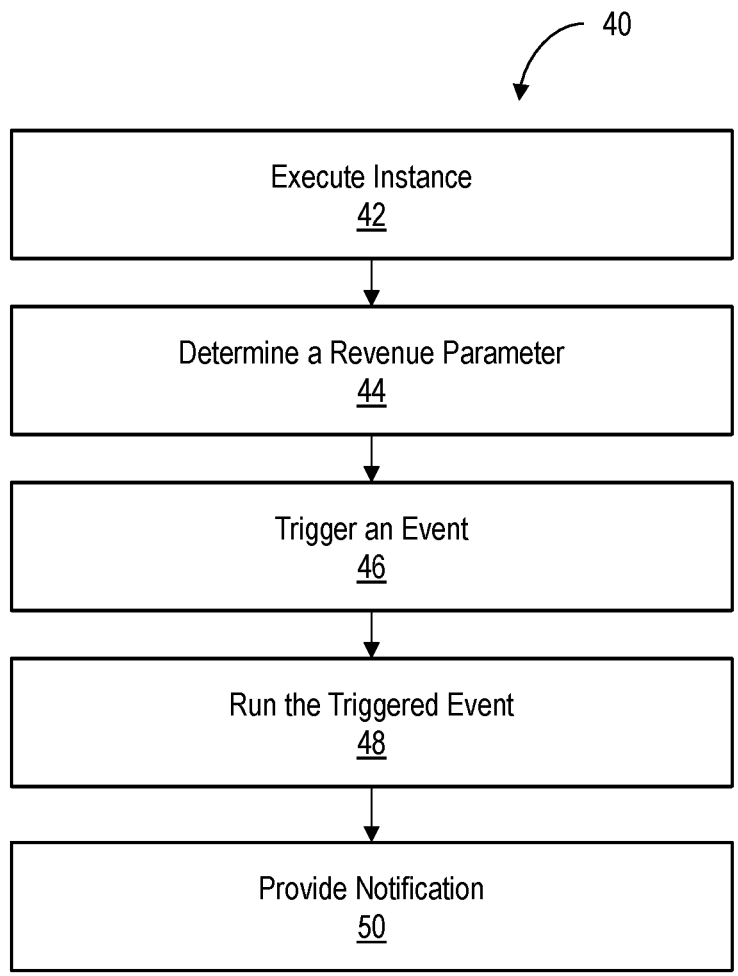
FIG. 2 illustrates an exemplary method of implementing dynamic content availability for individual players, according to an aspect of the invention.

FIG. 2 illustrates a method 40 configured to facilitate providing a tiered rebate system to a user of an online game, according to an aspect of the invention. The operations of method 40 presented below are intended to be illustrative. In some embodiments, method 40 may be accomplished with one or more additional operations not described, and/or without one or more of the operations discussed. The order in which the operations of method 40 are illustrated in FIG. 2 and described below is not intended to be limiting.

In some embodiments, method 40 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 40 in response to instructions stored electronically on an electronic storage medium. The one or more processing devices may include one or more devices configured through hardware, firmware, and/or software to be specifically designed for execution of one or more of the operations of method 40.

At an operation 42, an instance of a virtual space may be executed. In some implementations, operation 42 may be performed by a game module the same as or similar to game module 20 (shown in FIG. 1 and described above).

At an operation 44, the executed instance of the virtual space may determine a revenue parameter. The view information may define views to be presented to users via client computing platform(s). In some implementations, operation 44 may be performed by a spend module the same as or similar to spend module 22 (shown in FIG. 1 and described above).

At an operation 46, events may be triggered based on the revenue parameter. In some implementations, operation 46 may be performed by event trigger module the same as or similar to event trigger module 24 (shown in FIG. 1 and described above).

At an operation 48, the triggered event may be run. In some implementations, operation 48 may be performed by event trigger module the same as or similar to event trigger module 24 (shown in FIG. 1 and described above).

At an operation 50, one or more notifications may be provided to a user within the game space. In some implementations, operation 50 may be performed by a notification module the same as or similar to notification module 26 (shown in FIG. 1 and described above).

FIG. 3 illustrates an exemplary diagram of an operator interface which implements dynamic content availability for individual players, according to an aspect of the invention. As shown, operator interface 60 enables an operator to monitor in-game parameters to determine which events to set up. In some implementations, the in-game parameters include the time 62, the amount of currency spent 64, and a description of an event which may be triggered 66. In-game parameters may be based on any game performance parameter, user metric, any event spend parameter and/or any other parameters.

Figure 4:
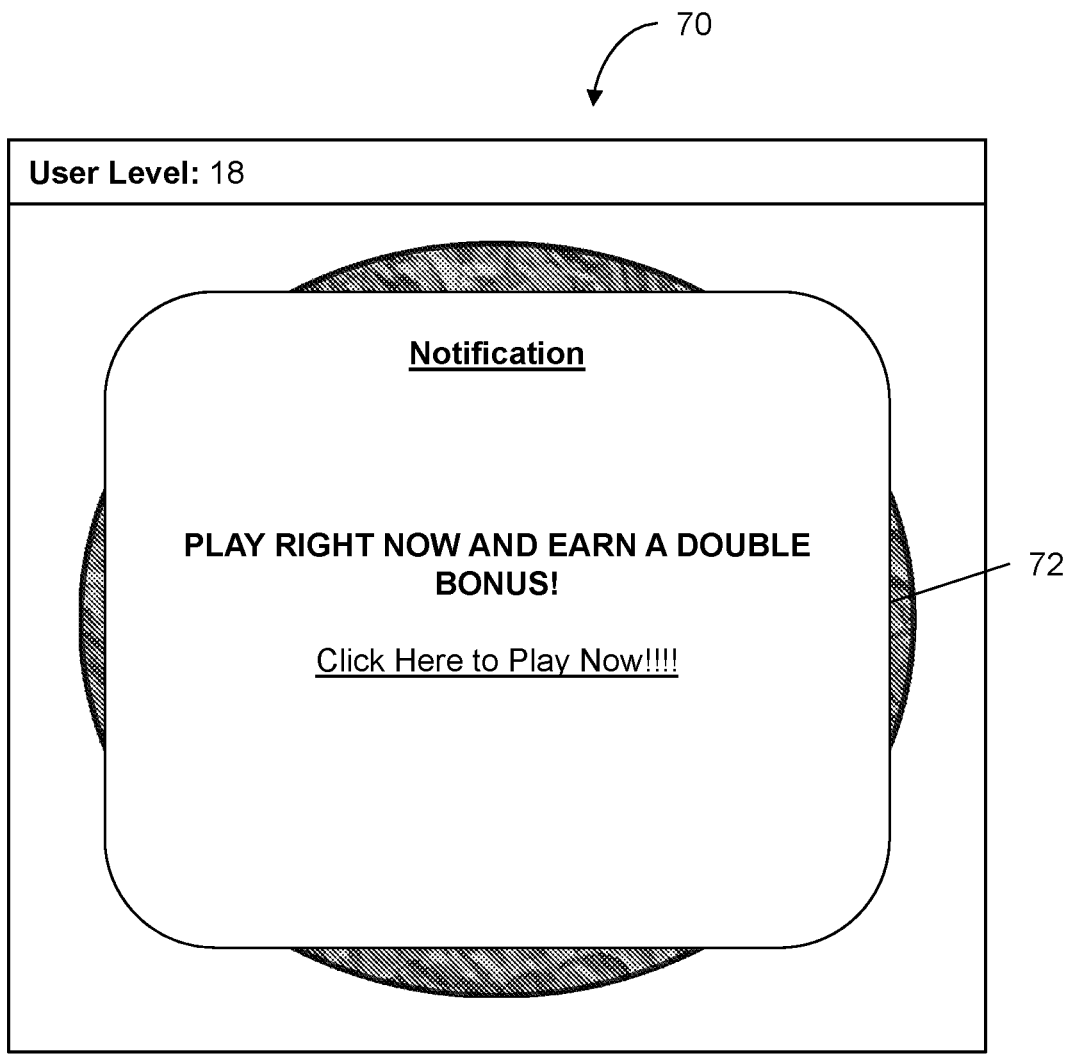
FIG. 4 illustrates an exemplary diagram of a user interface which implements dynamic content availability for individual players, according to an aspect of the invention.

FIG. 4 illustrates an exemplary diagram of a user interface 70 which implements dynamic content availability for individual players, according to an aspect of the invention. A user may receive a notification 72 at any time that an event has been triggered. Notifications of events may be in various forms including taking the form of banners, scrolling text or tickers, flashing objects, pop-up windows, frames or borders, and/or any other type of notification during and/or after the execution of the game.

Figure 5:
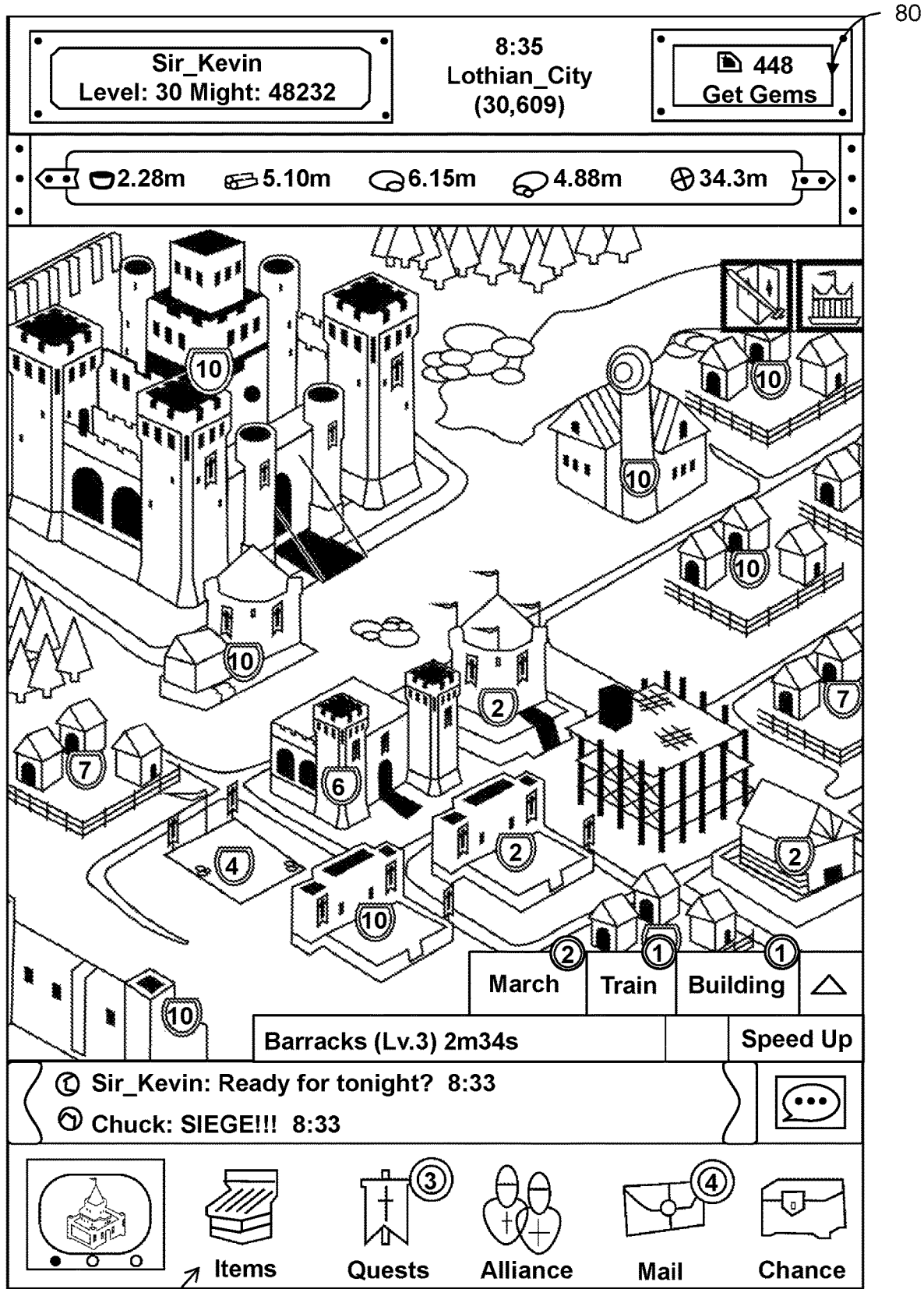
FIG. 5 illustrates an exemplary diagram of a user interface which implements dynamic content availability for individual players, according to an aspect of the invention.

FIG. 5 illustrates an exemplary diagram of a user interface 80 which implements dynamic content availability for individual players, according to an aspect of the invention. As shown, user interface 80 enables a user to view a list of virtual items available for purchase by selecting the items 82 tab.

Figure 6:
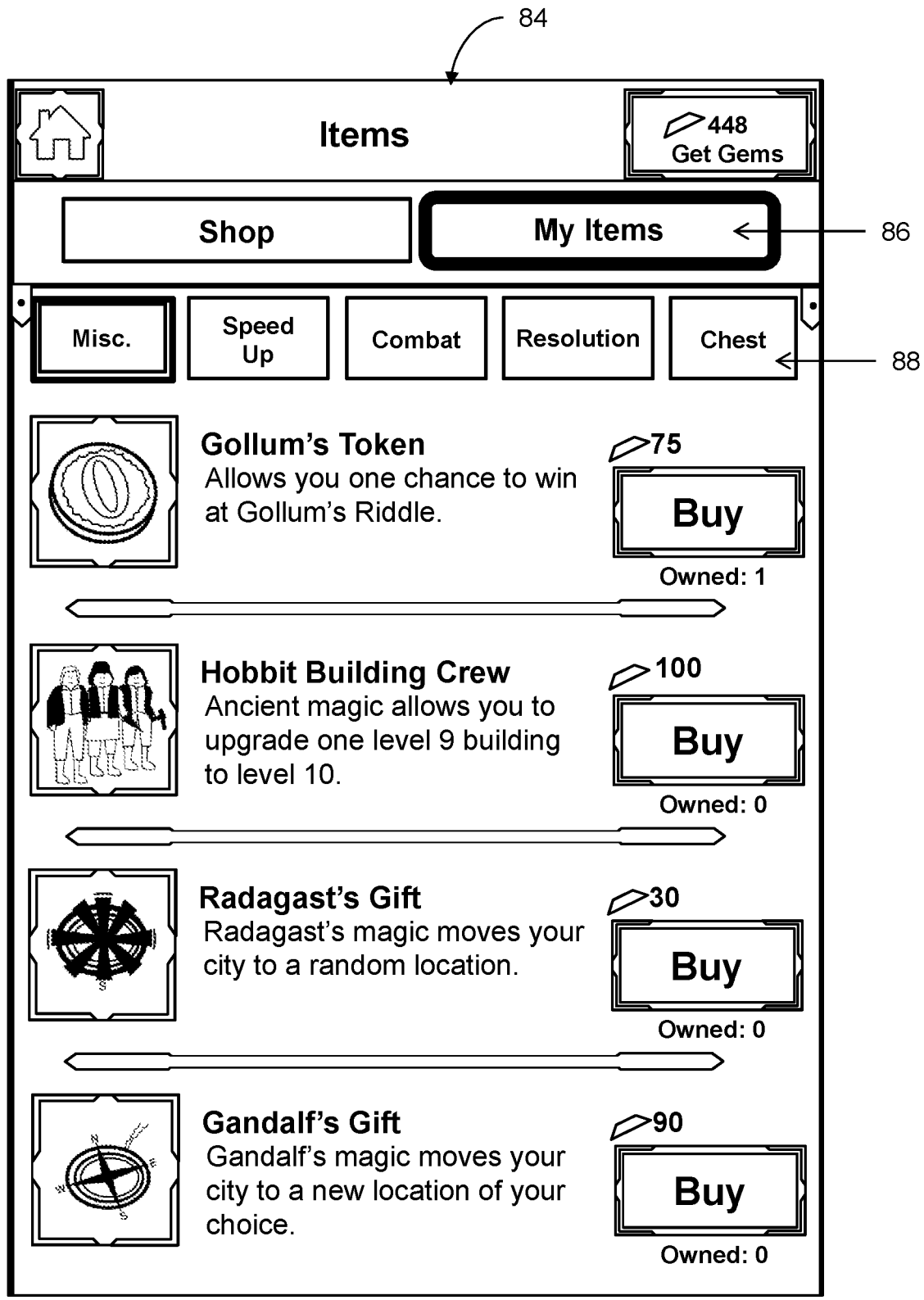
FIG. 6 illustrates an exemplary diagram of a user interface which implements dynamic content availability for individual players, according to an aspect of the invention.

FIG. 6 illustrates an exemplary diagram of a user interface 84 which implements dynamic content availability for individual players, according to an aspect of the invention. In some implementations, the user may select the my items tab 86, and view from a category 88 of virtual in-game goods obtained.

Figure 7:
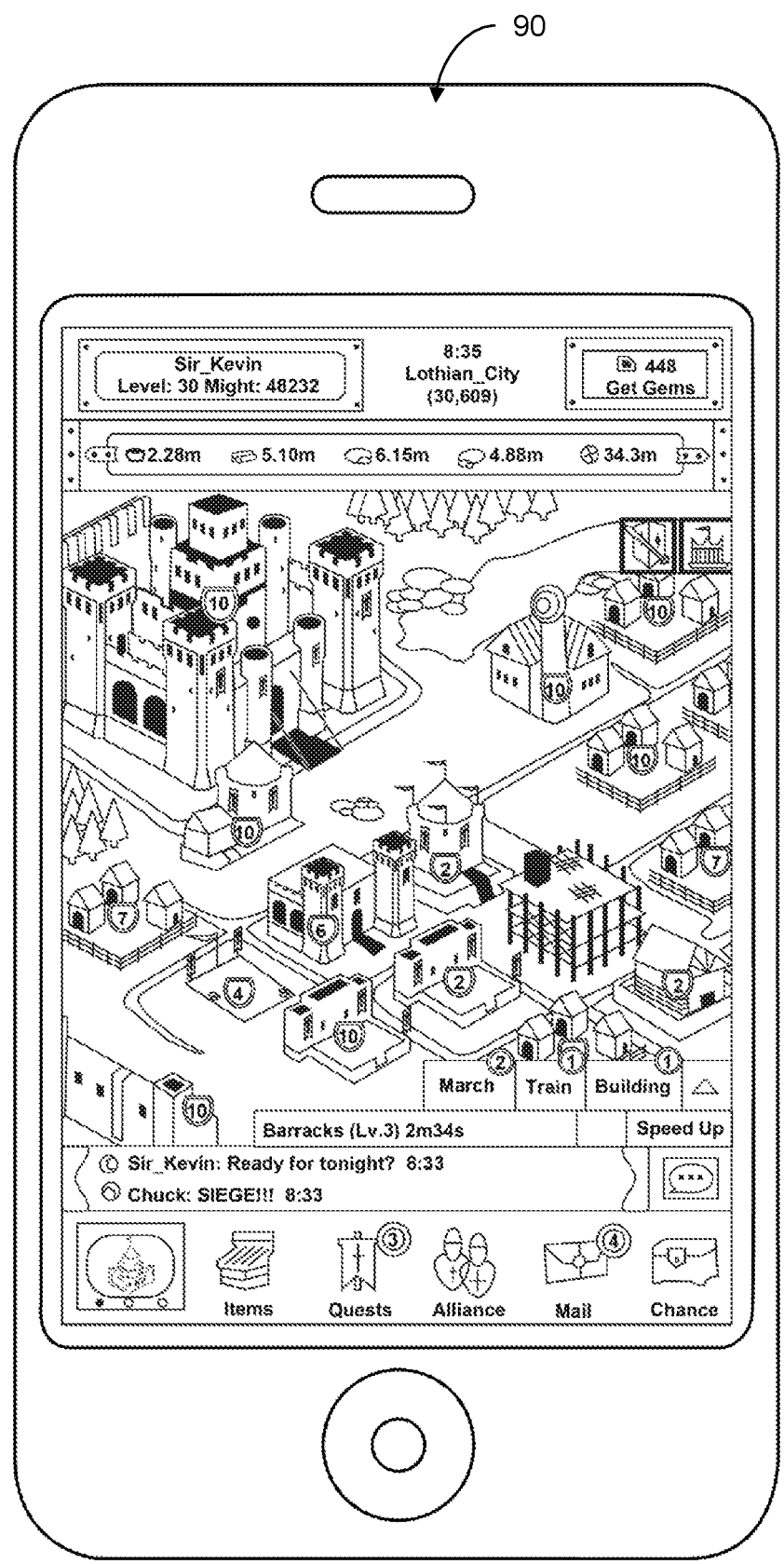
FIG. 7 illustrates an exemplary diagram of a user interface which implements dynamic content availability for individual players, according to an aspect of the invention.

FIG. 7 illustrates an exemplary diagram of a user interface 90 which implements dynamic content availability for individual players, according to an aspect of the invention. There may be several platforms in which the game may be implemented. Some platforms may include hardware platforms, operating system platforms and/or software platforms. In some implementations, hardware platform may include different types of systems in general (e.g., mainframe, workstation, desktop, handheld and/or embedded) and/or the specific type of processor (e.g., x86, SPARC, PowerPC and/or Alpha).

Figure 8:
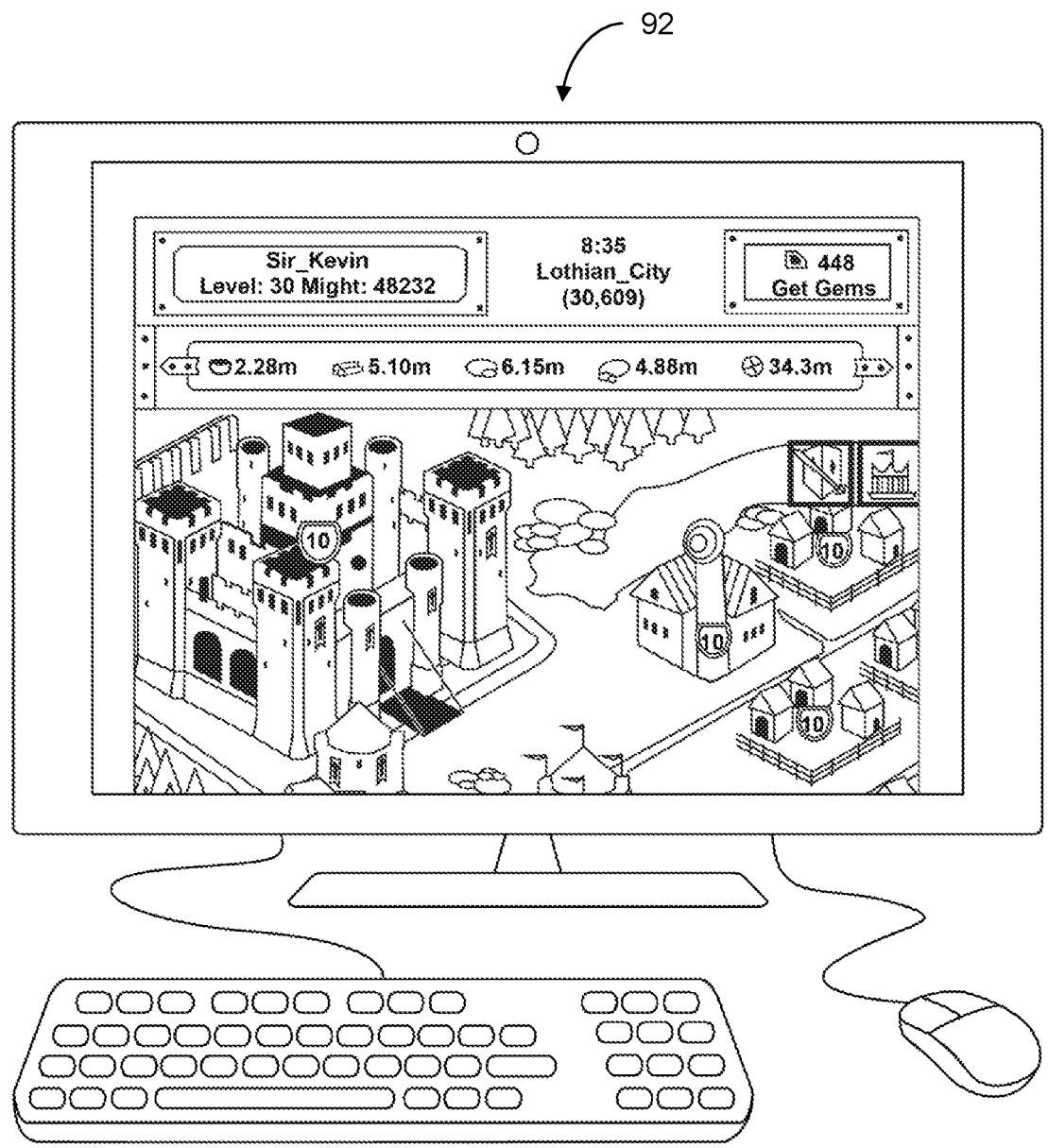
FIG. 8 illustrates an exemplary diagram of a user interface which implements dynamic content availability for individual players, according to an aspect of the invention.

FIG. 8 illustrates an exemplary diagram of a user interface 92 which implements dynamic content availability for individual players, according to an aspect of the invention.

Figure 9:
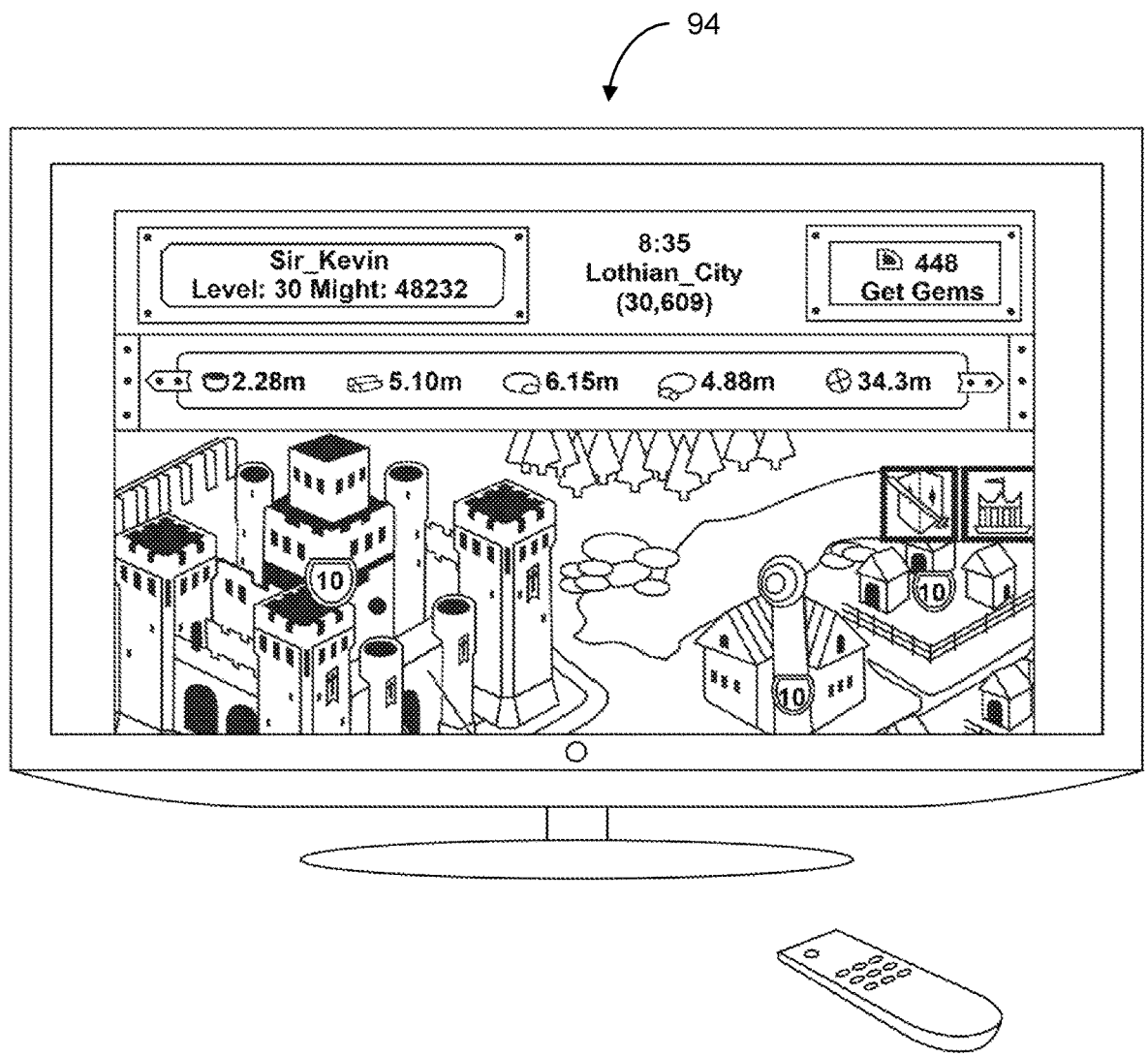
FIG. 9 illustrates an exemplary diagram of a user interface which implements dynamic content availability for individual players, according to an aspect of the invention.

FIG. 9 illustrates an exemplary diagram of a user interface 94 which implements dynamic content availability for individual players, according to an aspect of the invention.

It would be understood by one of ordinary skill in the art that the user interfaces may not be limited to the embodiment illustrated in FIGS. 3-9. The user interfaces may be associated with any objective, activity, action, or a combination thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating game events in a video game, the system comprising:
   one or more processors configured by machine-readable instructions to:
   execute a game instance of a game space, and use the game instance to facilitate presentation of views of the game space to users, wherein the game instance is configured to facilitate interaction of the users with the game space and/or each other by performing operations in the game instance in response to commands received from the users;
   determine a revenue parameter that characterizes a spend rate at which the users in the video game are collectively spending consideration in the video game;
   automatically trigger an event based on the revenue parameter in order to regulate a spend rate in the video game;
   run the triggered event within the game instance; and
   provide notification of the triggered event to one or more of the users.

2. The system of claim 1, wherein the one or more processors are configured by machine-readable instructions to:
   determine game space parameters; and
   trigger the event based on one or more of the game space parameters.

3. The system of claim 1, wherein the one or more processors are further configured by machine-readable instructions to select the triggered event from multiple possible events based on previously triggered events, and/or one or more game parameters.

4. The system of claim 1, wherein the one or more processors are further configured by machine-readable instructions to determine an event type and/or one or more event parameters based on previously triggered events, and/or one or more game parameters.

5. The system of claim 1, wherein the one or more processors are further configured by machine-readable instructions to provide a user interface to an operator of the video game to receive entry and/or selection of rules for triggering events, wherein the triggered event is triggered based on the rules.

6. The system of claim 1, wherein the one or more processors are further configured by machine-readable instructions to provide a user interface to an operator of the video game to receive entry and/or selection of event parameters for events to be run in the video game.

7. The system of claim 1, wherein the one or more processors are further configured by machine-readable instructions to group users into classifications based on one or more user parameters.

8. The system of claim 7, wherein the one or more user parameters comprise one or more of: geographic location, user level, or user spend frequency.

9. The system of claim 1, wherein the one or more processors are further configured by machine-readable instructions to determine an event parameter of the triggered event based on the revenue parameter.

10. The system of claim 1, wherein the one or more processors are further configured by machine-readable instructions to determine an event parameter of the triggered event based on a game parameter.

11. The system of claim 1, wherein the triggered event comprises one or more of a: promotion, off-peak hour game play, or tournament.

12. A computer-implemented method for facilitating game events in a video game, the method being implemented in a computer system that includes one or more physical processors configured by machine-readable instructions, the method comprising:

executing a game instance of a game space, and using the game instance to facilitate presentation of views of the game space to users, wherein the game instance facilitates interaction of the users with the game space and/or each other by performing operations in the game instance in response to commands received from the users;

determining a revenue parameter that characterizes a spend rate at which the users in the video game are collectively spending consideration in the video game;

automatically triggering an event based on the revenue parameter in order to regulate a spend rate in the video game;

running the triggered event within the game instance; and providing notification of the triggered event to one or more of the users.

13. The method of claim 12, further comprising triggering the event based on one or more game space parameters.

14. The method of claim 12, further comprising selecting the triggered event from multiple possible events based on previously triggered events, and/or one or more game parameters.

15. The method of claim 12, further configured to determine an event type and/or one or more event parameters based on previously triggered events, and/or one or more game parameters.

16. The method of claim 12, further configured to provide a user interface to an operator of the video game to receive entry and/or selection of rules for triggering events, triggering the event based on the rules.

17. The method of claim 12, further comprising providing a user interface to an operator of the video game to receive entry and/or selection of event parameters for events to be run in the video game.

18. The method of claim 12, further comprising grouping users into classifications based on one or more user parameters.

19. The method of claim 18, wherein the one or more user parameters comprise one or more of: geographic location, user level, or user spend frequency.

20. The method of claim 12, further comprising determining an event parameter of the triggered event based on the revenue parameter.

21. The method of claim 12, further comprising determining an event parameter of the triggered event based on a game parameter.

22. The method of claim 12, wherein the triggered event comprises one or more of a: promotion, off-peak hour game play, or tournament.

* * * * *